United States Patent
Koren et al.

(10) Patent No.: US 12,475,486 B2
(45) Date of Patent: *Nov. 18, 2025

(54) ISOLATED BUDGET UTILIZATION

(71) Applicant: Yahoo Ad Tech LLC, New York, NY (US)

(72) Inventors: Yair Koren, Zichron Yaacov (IL); Abraham Shahar, Tel Aviv (IL); Tal Cohen, Netanya (IL); Michal Aharon, Haifa (IL); Assaf Singer, Geni Tikva (IL)

(73) Assignee: Yahoo Ad Tech LLC, New York, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 18/230,997

(22) Filed: Aug. 7, 2023

(65) Prior Publication Data

US 2023/0377003 A1     Nov. 23, 2023

Related U.S. Application Data

(63) Continuation of application No. 16/413,816, filed on May 16, 2019, now Pat. No. 11,720,928.

(51) Int. Cl.
*G06Q 30/0273* (2023.01)
*G06Q 30/0242* (2023.01)
*G06Q 30/0251* (2023.01)

(52) U.S. Cl.
CPC ..... *G06Q 30/0273* (2013.01); *G06Q 30/0243* (2013.01); *G06Q 30/0246* (2013.01); *G06Q 30/0254* (2013.01)

(58) Field of Classification Search
CPC .................. G06Q 30/0207–30/0277
See application file for complete search history.

(56) References Cited

U.S. PATENT DOCUMENTS

| | | | | |
|---|---|---|---|---|
| 10,769,676 | B2* | 9/2020 | Bishop | G06Q 30/0277 |
| 11,748,821 | B1* | 9/2023 | Trahan | G06Q 40/02 |
| | | | | 705/30 |

(Continued)

FOREIGN PATENT DOCUMENTS

| | | | | |
|---|---|---|---|---|
| GB | 2503786 | A * | 1/2014 | G06Q 30/0242 |

OTHER PUBLICATIONS

N. Karlsson and J. Zhang, "Applications of feedback control in online advertising," 2013 American Control Conference, Washington, DC, USA, 2013, pp. 6008-6013, doi: 10.1109/ACC.2013.6580779. (Year: 2013).*

(Continued)

*Primary Examiner* — Waseem Ashraf
*Assistant Examiner* — Scott Snider
(74) *Attorney, Agent, or Firm* — Cooper Legal Group LLC

(57) ABSTRACT

One or more computing devices, systems, and/or methods for isolated budget utilization are provided. A first budget pacing component is assigned to control bidding by a first content serving component for a set of content items. A second budget pacing component is assigned to control bidding by a second content serving component for the set of content items. The first budget pacing component controls the bidding by the first content serving component according to a first portion of a content item budget based upon a traffic share of the first content serving component. The second budget pacing component controls the bidding by the second content serving component according to a second portion of the content item budget based upon a traffic share of the second content serving component.

20 Claims, 7 Drawing Sheets

(56) References Cited

U.S. PATENT DOCUMENTS

2014/0122221 A1* 5/2014 Jordan ................ G06Q 30/02
705/14.43
2015/0227963 A1* 8/2015 Geyik ............... G06Q 30/0249
705/14.42

OTHER PUBLICATIONS

Adikari, S. (2017). Revenue optimization in real-time bidding based advertising for mobile devices (Order No. 10907566). Available from ProQuest Dissertations and Theses Professional. (2088465830) (Year: 2017).*

K. Lee, A. Jalali, A. Dasdan, "Real Time Bid Optimization with Smooth Budget Delivery in Online Advertising", May 14, 2013, https://doi.org/10.48550/arXiv.1305.3011 (Year: 2013).*

J. Xu, K. Lee, W. Li, H. Qi, Q. Lu, "Smart Pacing for Effective Online Ad Campaign Optimization", Jun. 18, 2015, https://doi.org/10.48550/arXiv.1506.05851 (Year: 2015).*

* cited by examiner

ISOLATED BUDGET UTILIZATION

RELATED APPLICATION

This application claims priority to and is a continuation of U.S. application Ser. No. 16/413,816, filed on May 16, 2019, entitled "ISOLATED BUDGET UTILIZATION", which is incorporated by reference herein in its entirety.

BACKGROUND

Many providers, such as applications, services, and websites, provide users with access to content. In one example, a user may access emails through a mobile email application executing on a mobile device of the user. In another example, the user may navigate to a news website in order to view sports news information. In this way, users may access content from content providers that are displayed through user interfaces, such as applications and web browsers.

A provider may allow content items from other entities to be displayed through a user interface or webpage of the provider. For example, the news website may allow other companies to display content items relating to products, events, articles, recommendations, or other information that may be relevant to a user that is visiting the news website. The content items may comprise images, videos, text, audio, links, or other types of content. Because there may be millions of different content items from various entities that could be displayed, a content serving platform may be used to determine which content items to display to particular users.

Entities may pay to have content items shown to users, such as payment for when a user views a content item, clicks a content item, purchases an item or service from a landing page linked to by a content item, etc. Content item budgets may be set for content items, and are spent as users interact with content items shown to those users. The content serving platform may utilize various content serving algorithms and models to determine which content items to show to users. For example, each content item is ranked based upon a bid value and a predicted likelihood of a particular user interacting in a particular way with the content item. In this way, a highest ranked content item is shown to that particular user.

SUMMARY

In accordance with the present disclosure, one or more computing devices and/or methods for isolated budget utilization are provided. A content serving platform may utilize a first content serving component, a second content serving component, and/or other content serving components to determine what content items to transmit to providers, such as websites and applications, for display to particular users. A content serving component may utilize a model for predicting the likelihood that a user will interact with particular content items in particular ways. Thus, when a content display opportunity arises to show a content item to a user, eligible content items are identified and ranked based upon bid values and predicted likelihoods of user interaction to determine which content item to show.

Budget pacing components are assigned to the content serving components. In an example, a single budget pacing component is assigned to a single content serving component so that there is a one-to-one correspondence between budget pacing components and content serving components. For example, a first budget pacing component is assigned to control bidding by the first content serving component, a second budget pacing component is assigned to control bidding by the second content serving component, etc. A budget pacing component determines bid values for content items that bid on content display opportunities. In this way, a content item is ranked based upon a bid value and a predicted likelihood that a user will interact with the content item. Thus, a highest ranked content item may win a content display opportunity to be displayed to the user.

A content item may be associated with a content item budget. The content item budget may correspond to a budget constrained campaign such that budget for the content item is spent over a time period until depletion, such as over a day. The content item budget is a budget that is used to pay for the interaction of a user with the content item through a provider, such as where a user views the content item, clicks the content item, purchases an item from a landing page linked to by the content item, etc. As the content item budget is spent, revenue is generated by the content serving platform. Revenue (e.g., revenue proportional to user interactions with content items) or functions thereof may be used to gauge the effectiveness of a content serving component.

In an example such as where there is merely a one to one correspondence between budget pacing components and content service components, in order to accurately and precisely gauge performance and effectiveness of content serving components, each content serving component is constrained to using a particular portion of the content item budget to mitigate instances where a content serving component "steals" budget from other content serving components and thus appears to be performing better than in actuality. Accordingly, a first portion of the content item budget of the content item is assigned to the first budget pacing component to control the bidding performed by the first content serving component. The first portion of the content item budget may be proportional to a traffic share of content display opportunities that are routed to the first content serving component. A second portion of the content item budget is assigned to the second budget pacing component to control the bidding by the second content serving component. The second portion of the content item budget may be proportional to a traffic share of content display opportunities that are routed to the second content serving component. In this way, a content serving component is constrained to using merely a portion of the content item budget that is proportional to a traffic share of the content serving component so that the content serving component cannot steal budget from other content serving components.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
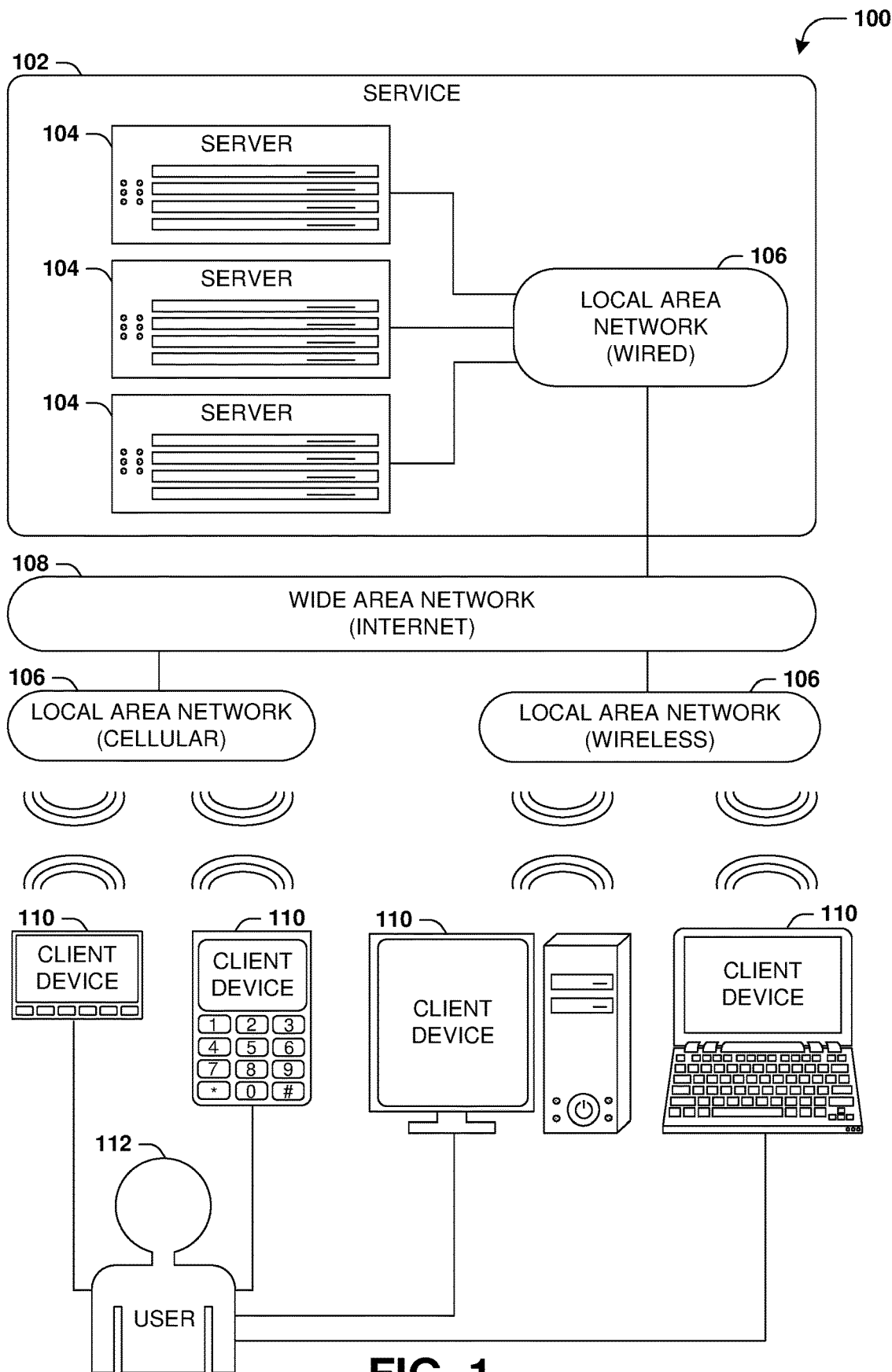
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
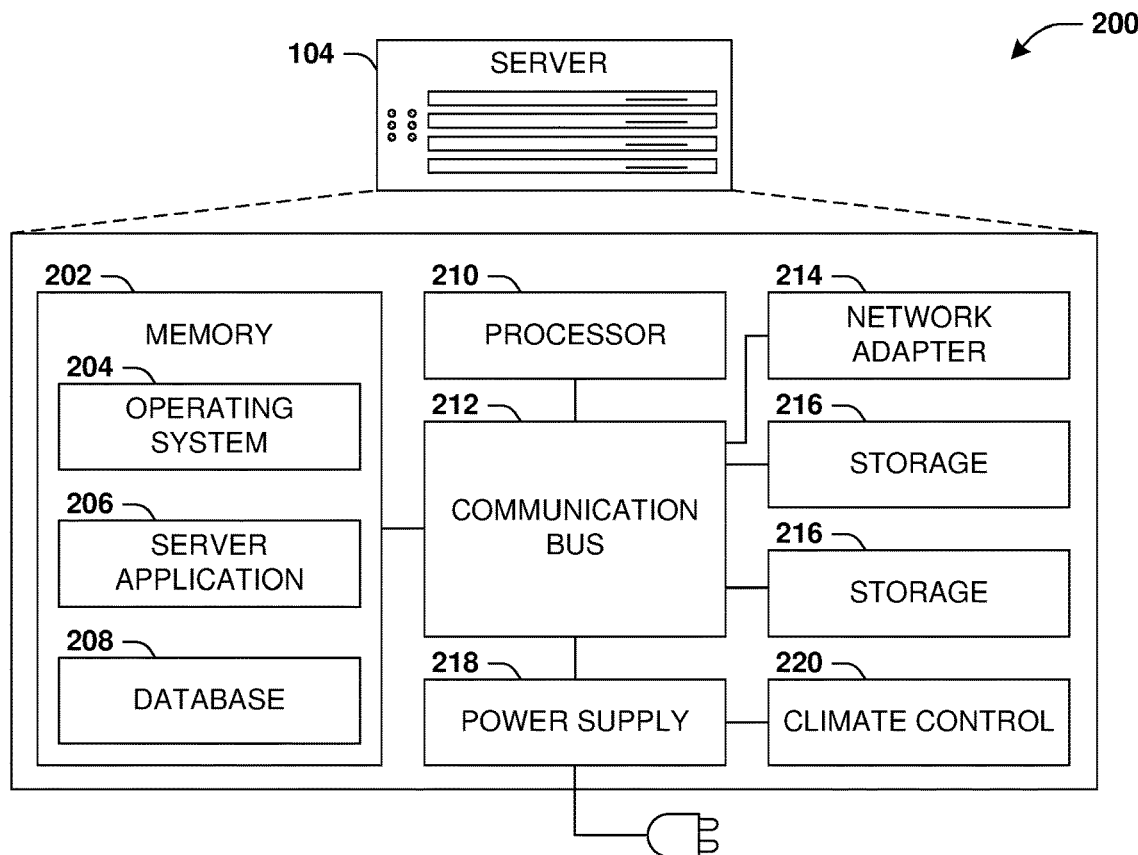
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
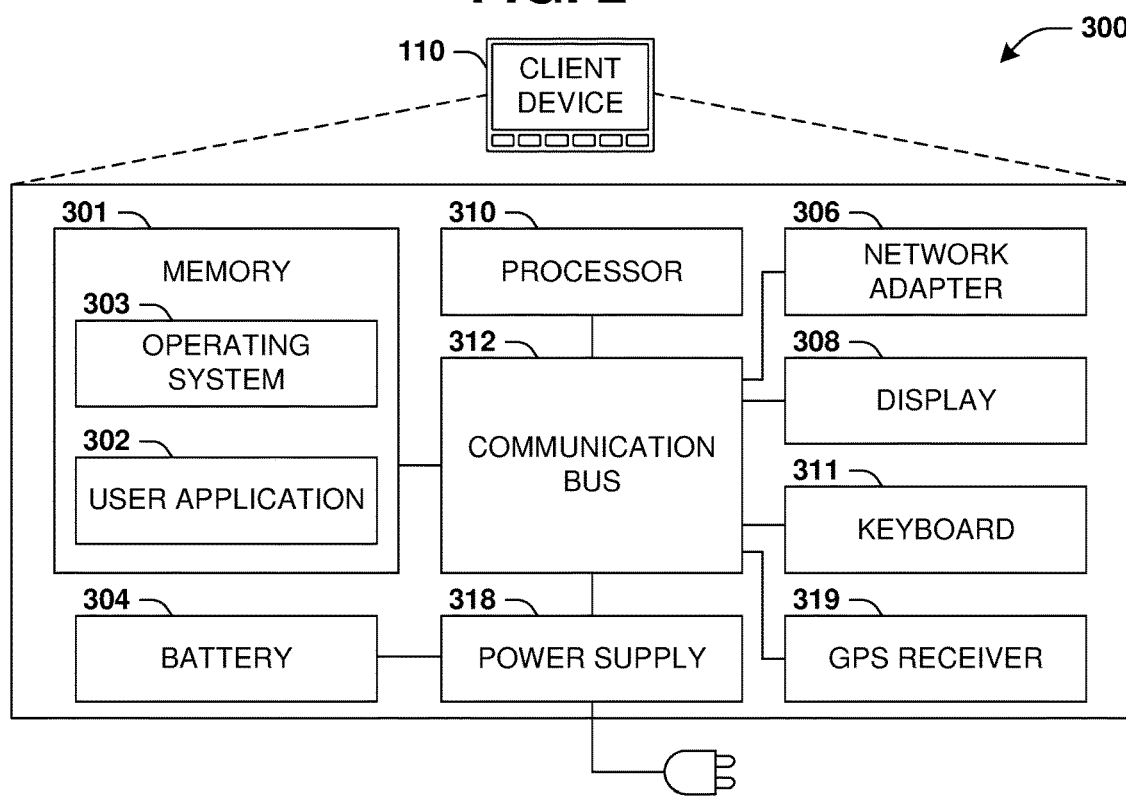
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for isolated budget utilization are provided. A budget pacing system and content serving platform are configured to identify, rank, and provide eligible content items to providers such as websites and applications for display to users. For example, when a user accesses a webpage, there is a call to the content serving platform requesting one or more content items to include within the webpage. There may be hundreds of thousands or more available content items. The content serving platform may utilize information about the webpage, the user, and/or other information to determine what content items are eligible for the user. For example, if the user is a male, then content items that are to be shown only to females are excluded. The content serving platform may rank the eligible content items based upon bid values for each content item and predicted probabilities that this user will interact in certain ways with particular content items. In an example, a highest ranked content item is returned to the webpage for display to the user.

Each content item may have a content item budget that is spent as content display opportunities are won and as users interact with the content item. This is because there may be a charge/cost when a user interacts with a content item in a particular manner (e.g., viewing a content item, clicking a content item, performing an action such as purchasing an associated item/service, etc.). For example, a content item budget may be set at $100 for a time period such as a day. The content item may be budget constrained, and thus the $100 may be depleted over the day.

The budget pacing system is configured to pace the spending of the content item budget over the day (e.g., for uniform spending over the day). In an example, spending may be paced by modifying bid values. For example, spending is slowed down by decreasing bid values for a content item so that the content item may be ranked lower than other content items with higher bid values, and thus the content item will lose content display opportunities to be shown to users. Similarly, the rate of spending can be increased by increasing bid values so that the content item wins more content display opportunities to be shown to users. Spending may also be paced through throttling, such as where the content serving platform is instructed to make a content item ineligible for content display opportunities with a certain probability (such as 50%).

The content serving platform may utilize multiple content serving components to identify, rank, and provide content items to providers. A content serving component may comprise an algorithm that utilizes a model to predict a likelihood that a particular user will interact in a particular way with a particular content item. The content serving component may perform other various actions, such as determining where a content item should be displayed within a user interface, what type of content item should be shown (e.g., a video, a link, an image, etc.), what text to include within the content item, determining a size of the content item, enforcing visibility restrictions (e.g., select which image to display from a set of images), and/or a vast array of other actions relating to identifying, ranking, and displaying of content items.

Each content serving component may be tested to see how the content serving components perform, such as whether a content serving component is spending at a higher relative rate than other content serving components or whether it is spending budget as expected/desired (e.g., are content items being shown to users that are then interacting with those content items). Unfortunately, conventional testing techniques are unable to accurately test and gauge the performance of content serving components, such as for content items that are budget constrained. This is because content serving components can "steal" budget from other content serving components, and thus appear to be performing better than they would in actuality. This can occur, for example, if a content serving component is predicting high user interaction probabilities that are causing content items to win content display opportunities even though the actual user interaction rate is lower.

Accordingly, as provided herein, a single budget pacing component may be assigned to a single content serving component whose bidding is controlled by no other budget pacing component. Each budget pacing component is assigned a portion of a content item budget that is proportional to a traffic share of content display opportunities routed to a corresponding content serving component. For example, a content item budget is $100. 10% traffic share of content display opportunities (e.g., a content display opportunity corresponds to a call from a provider for a content item to display to a user) may be assigned to a first content serving component and 90% traffic share of content display opportunities may be assigned to a second content serving component. Based upon the 10% traffic share, $10 of the $100 content item budget is assigned to a first budget pacing component for controlling bids by the first content serving component for the content item. Based upon the 90% traffic share, $90 of the $100 content item budget is assigned to a second budget pacing component for controlling bids by the second content serving component for the content item. The budget pacing components are made aware of what amount has been spent from their portion of the content item budget so that their portion of the content item budget is not exceeded. In this way, content serving components cannot steal budget from other content serving components, and thus more accurate performance can be measured.

Figure 4:
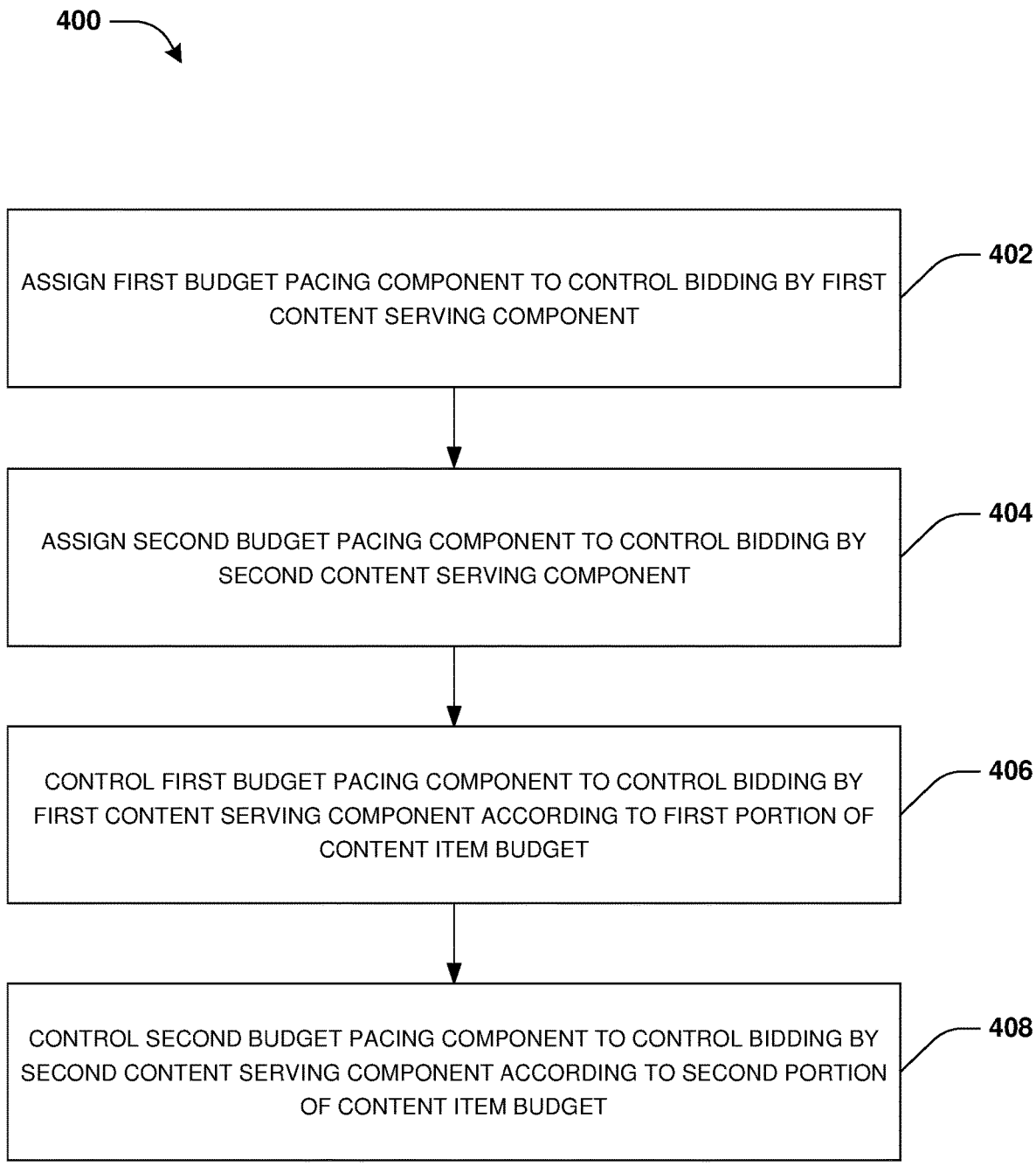
FIG. 4 is a flow chart illustrating an example method for isolated budget utilization.
Figure 5A:
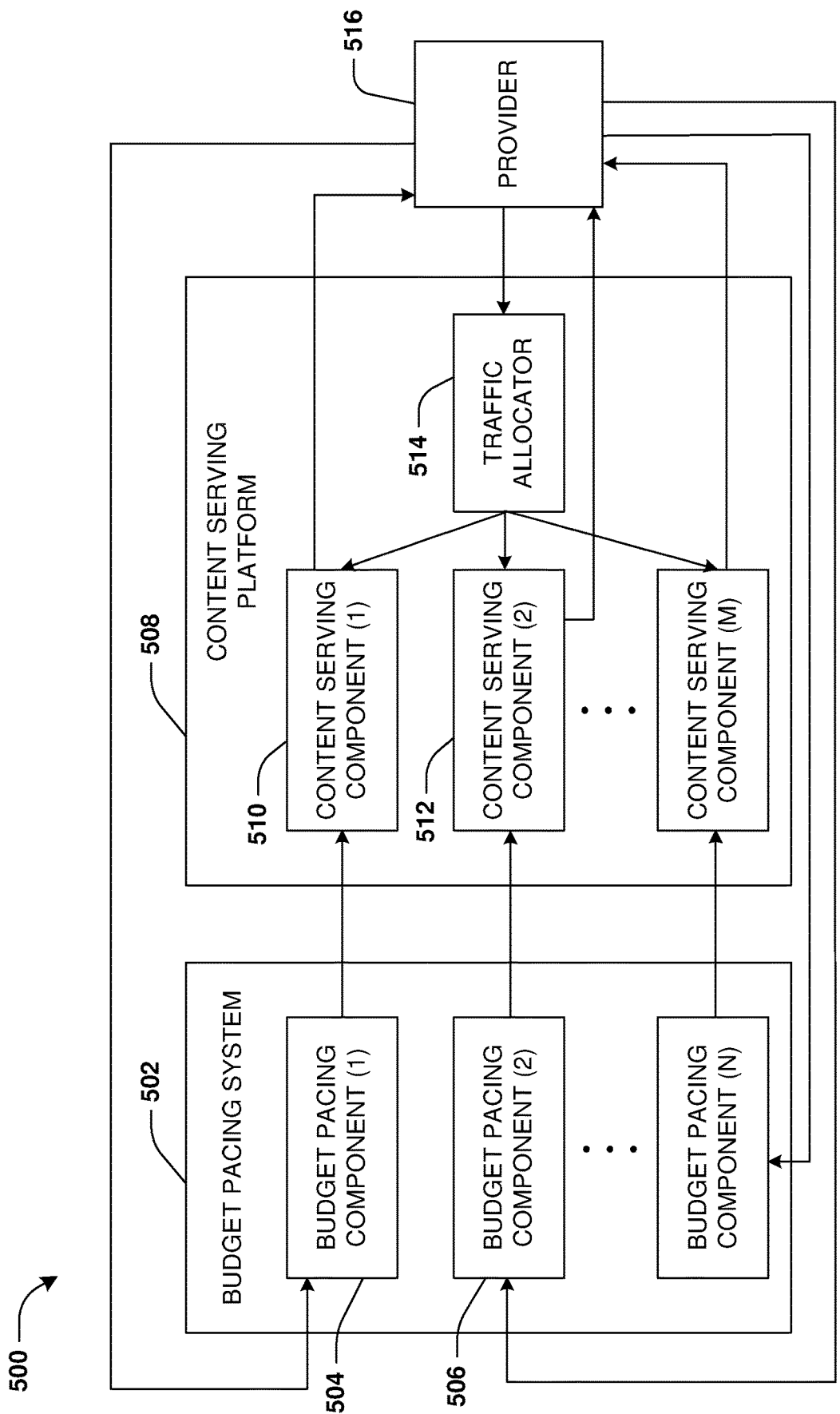
FIG. 5A is a component block diagram illustrating an example system for isolated budget utilization.
Figure 5B:
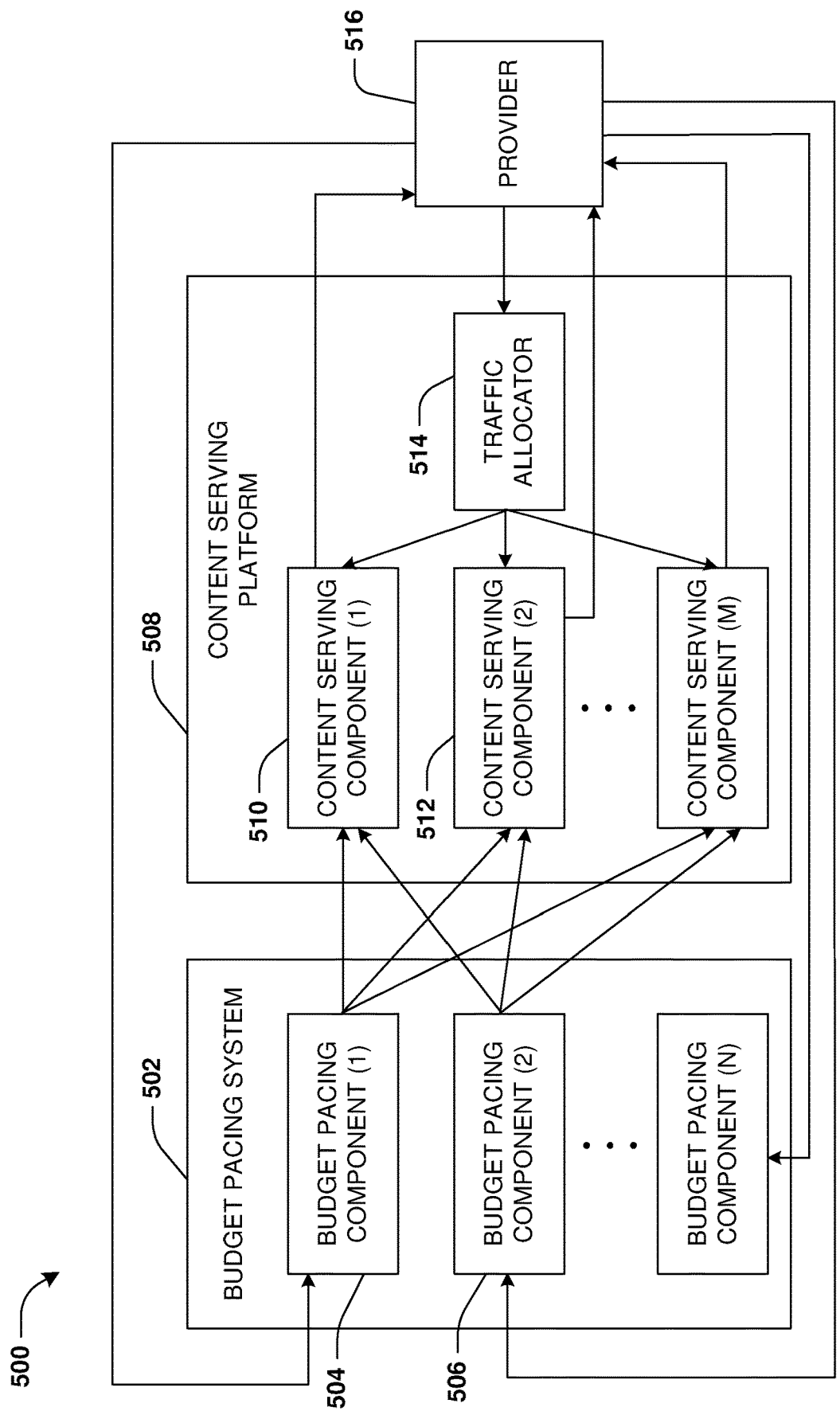
FIG. 5B is a component block diagram illustrating an example system for isolated budget utilization.
Figure 5C:
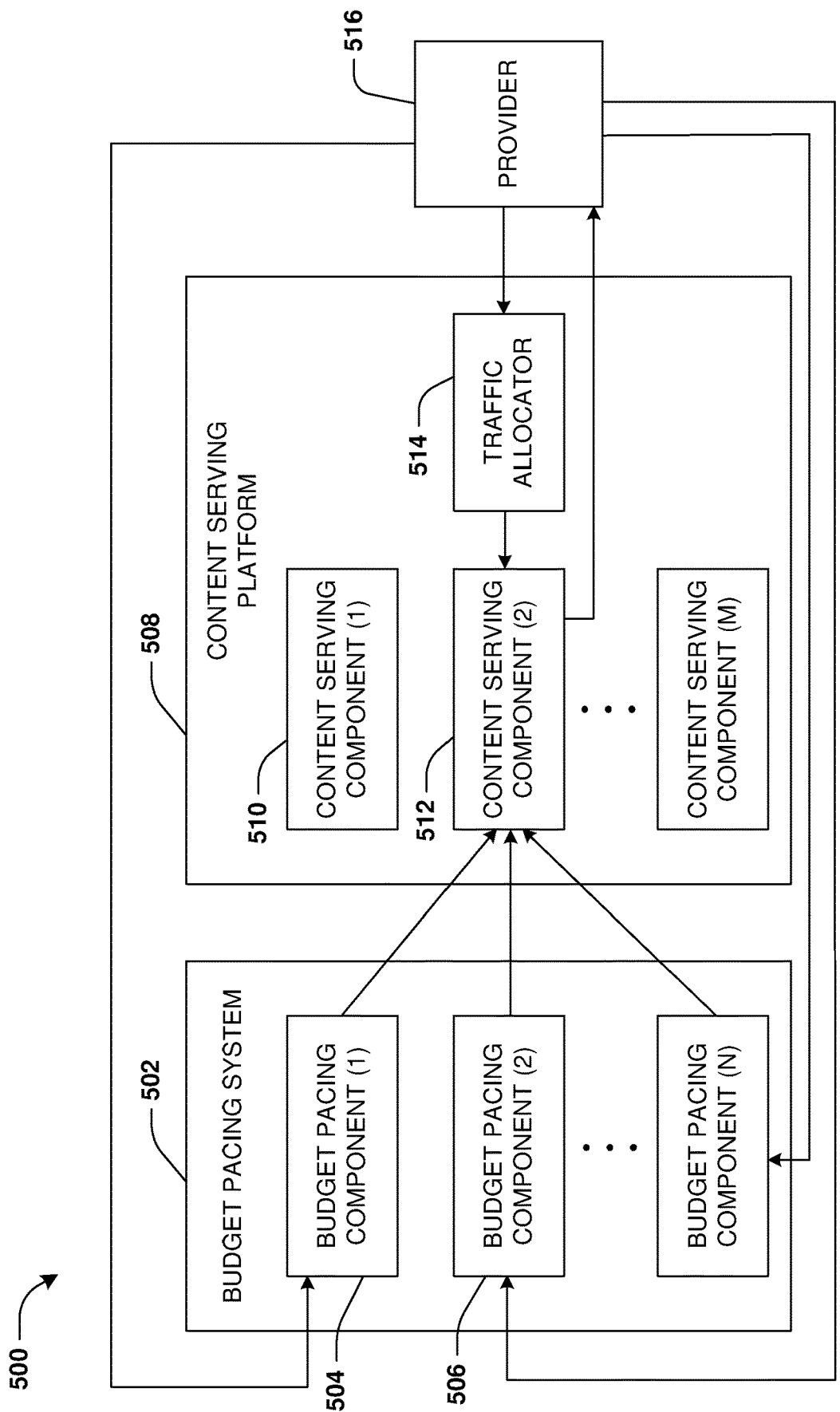
FIG. 5C is a component block diagram illustrating an example system for isolated budget utilization.

An embodiment of isolated budget utilization is illustrated by an example method 400 of FIG. 4, which is described in conjunction with system 500 of FIGS. 5A-5C. A content serving platform 508 hosts a plurality of content serving components, such as a first content serving component 510 and a second content serving component 512, configured to identify, rank, and provide content items to providers for display to users. A traffic allocator 514 is configured to route content display opportunities (e.g., requests for content items to display, such as a request from a provider 516 such as a website to display content items through a webpage being accessed by a user) to the first content serving component 510, the second content serving component 512, and/or other content serving components of the content serving platform 508. For example, 20% of content display opportunities are routed to the first content serving component 510, 50% of content display opportunities are routed to the second content serving component 512, and the remaining 30% of content display opportunities are routed to other content serving components of the content serving platform 508.

Different content serving components may be used by the content serving platform 508 because each content serving component may operate differently. For example, the first content serving component 510 may utilize a first model for assigning probabilities of user interactions with content items, whereas the second content serving component 512 may utilize a second model for assigning probabilities of user interactions with content items. In this way, multiple content serving components may be tested to see how well they perform in comparison to a baseline or to each other.

For example, content serving components may be ranked based upon revenue they generate or a function thereof (e.g., revenue of a content serving component in relation to the number of content display opportunities routed to that content serving component).

The content serving platform 508 may maintain hundreds of thousands of different content items that are dynamically being added, removed, or modified. Each content item may be associated with a content item budget. For example, a running shoe content item, comprising a running shoe image and a link to an article about different types of running shoes, may have a content item budget of $1,000 to spend per day on bidding to win content display opportunities to show the running shoe content item to users such that the bid value is paid if the user clicks on the link to arrive at the landing page or performs some other requisite action. In an example, the content item may be budget constrained with a set budget that is to be depleted within a time period, such as a day.

A budget pacing system 502 comprises budget pacing components configured to pace the spending of portions of the content items budgets over the day by corresponding content serving components. A single budget pacing component may be assigned to a single content serving component such that there is a one to one relationship between budget pacing components being assigned to content serving components. Thus, there may be a same number of budget pacing components as there are content serving components. In an example, there may be (N) budget pacing components and (M) content serving components, where N and M are integers greater than 0. In an example, N and M are the same, and thus there are the same number of budget pacing components as there are content serving components. In an example, N is greater than M, and thus there are more budget pacing components than there are content serving components. In an example, M is greater than N, and thus there are more content serving components than there are budget pacing components.

At 402, a first budget pacing component 504 is assigned to control bidding by a first content serving component 510 on content display opportunities for a first set of content items of the content serving platform 508. For example, the first budget pacing component 504 may be assigned to create bid values that the first content serving component 510 will use for bidding on opportunities to provide the running shoe content item to users.

At 404, a second budget pacing component 506 is assigned to control bidding by the second content serving component 512 on content display opportunities for a second set of content items of the content serving platform 508. For example, the second budget pacing component 506 may be assigned to create bid values that the second content serving component 512 will use for bidding on opportunities to provide the running shoe content item to users. In an example, the second set of content items comprise the same content items as the first set of content items. In another example, the second set of content items and the first set of content items may comprise some of the same content items and some different content items.

At 406, the first budget pacing component 504 controls the bidding by the first content serving component 510 according to a first portion of the content item budget. The first budget pacing component 504 may set bid values, perform throttling, stop bidding due to the first portion of the content item budget being depleted, and/or otherwise control bidding based upon the first portion of the content item budget and the amount spent by the content item. The first portion of the content item budget may be based upon a first traffic share of content display opportunities routed to the first content serving component 510 by the traffic allocator 514. For example, the content item budget of the running shoe content item is $1,000. The traffic allocator 514 routes 20% of content display opportunities to the first content serving component 510. Accordingly, the first portion of the content item budget of $1,000 would be $200. In this way, the first portion of the content item budget is set as a first percentage of the content item budget (e.g., 20% of $1,000 as $200), where the first percentage is equal to the first traffic share of the first content serving component 510.

At 408, the second budget pacing component 506 controls the bidding by the second content serving component 512 according to a second portion of the content item budget. The second budget pacing component 506 may set bid values, perform throttling, stop bidding due to the second portion of the content item budget being depleted, and/or otherwise control bidding based upon the second portion of the content item budget and the amount spent by the content item. The second portion of the content item budget may be based upon a second traffic share of content display opportunities routed to the second content serving component 512 by the traffic allocator 514. For example, the content item budget of the running shoe content item is $1,000. The traffic allocator 514 routes 50% of content display opportunities to the second content serving component 512. Accordingly, the second portion of the content item budget of $1,000 would be $500. In this way, the second portion of the content item budget is set as a second percentage of the content item budget (e.g., 50% of $1,000 as $500), where the second percentage is equal to the second traffic share of the second content serving component 512.

During operation, the traffic allocator 514 routes 20% of content display opportunities to the first content serving component 510, 50% of content display opportunities to the second content serving component 512, and 30% of content display opportunities to the other content serving components. The first budget pacing component 504 will pace the spending of the first portion of the content item budget of $200 over the day by the first content serving component 510. The second budget pacing component 506 will pace the spending of the second portion of the content item budget of $500 over the day by the second content serving component 512. The other budget pacing components will pace the spending of the rest of the content item budget of 300$ over the day by the other content serving components (e.g., where there are a different number of budget pacing components (N) as there are content serving components (M)).

The first budget pacing component 504 is controlled to stop the bidding of the content item by the first content serving component 510 once the first portion of the content item budget of $200 is depleted. The second budget pacing component 506 is controlled to stop the bidding of the content item by the second content serving component 512 once the second portion of the content item budget of $500 is depleted. Each of the other budget pacing components are controlled to stop the bidding of the content item by each of the other content serving components once the rest of the content item budget of $300 is depleted. In particular, amounts spent by the content serving components may be individually tracked so that each budget pacing component can determine how much has been spent by the corresponding content serving components, In this way, a budget pacing component will stop the bidding of the corresponding content serving components once its portion of the content item budget is reached.

The content item budget may apply to a particular time period, such as a day. During the day, the first content serving component 510 may deplete the first portion of the content item budget of $200 and the second content serving component 512 may deplete the second portion of the content item budget of $500. A portion of the content item budget is spent when the content item wins a bid on a content display opportunity from a provider and the user performs the requisite action based upon the content item (e.g., views the content item, clicks the content item, purchases a product or service through a landing page linked to by the content item, etc.). The spend performed by the content item is attributed to a portion of the content item budget allocated to the budget pacing component associated with the content serving component that provided the content item to the provider.

In an example, the provider 516 transmits a request to the content serving platform 508 for one content item to populate one slot within a webpage. The traffic allocator 514 may route the request to the first content serving component 510. The first content serving component 510 may utilize information about the user, the provider 516, and/or other information to predict probabilities of the user interacting with content items within the first set of content items. For example, the first content serving component 510 assigns a probability of the user interacting with the running shoe content item. The first budget pacing component 504 may control bid values for each of the content items if there is remaining budget within portions of content item budgets of the content items assigned to the first budget pacing component 504. For example, the first budget pacing component 504 may assign a bid value for the running shoe content item based upon there being a remaining amount of the content item budget for the running shoe content item assigned to the first budget pacing component 504.

The first content serving component 510 ranks each of the content items based upon their bid values and their predicted probabilities of user interaction. For example, a product of a bid value and a predicted probability of user interaction is used as a rank for a content item. In an example, a highest ranked content item, such as the running shoe content item, is returned to the provider 516 for display through the webpage. Upon the user performing a requisite action (e.g., clicking the running shoe content item that links to the article about different types of running shoes), a spend event of magnitude that is derived from the content item bid is generated. This spend event is tracked and attributed to the first portion of the content item budget assigned to the first budget pacing component 504.

During the day, the traffic shares allocated to the content serving components may be dynamically modified. For example, the first traffic share of the first content serving component 510 may be changed from 20% to 40% and the second traffic share of the second content serving component 512 may be changed from 50% to 30%. The first portion of the content item budget of the running shoe content item may be adjusted for the first budget pacing component 504 based upon the modified first traffic share of 40%. Thus, the modified first portion of the content item budget for the first budget pacing component 504 may now be $400 (40% of the $1,000 overall content item budget of the running shoe content item). The second portion of the content item budget of the running shoe content item may be adjusted for the second budget pacing component 506 based upon the modified second traffic share of 30%. Thus, the modified second portion of the content item budget for the second budget pacing component 506 may now be $300 (e.g., 30% of the $1,000 overall content item budget of the running shoe content item).

Various issues can arise when the traffic shares, and thus budget allocations to budget pacing components, are dynamically modified. In one example, a third content serving component may have been assigned a 1% traffic share. Thus, a third budget pacing component may be allocated a third portion of the $1,000 of the content item budget as $10 (e.g., 1% of the overall $1,000 content item budget). At mid-day, the traffic share of the third content serving component may be increased to 90%. The third portion of the content item budget may be proportionally increased to 90% of the content item budget as $900 (e.g., 90% of the overall $1,000 content item budget). At this point, since it may be configured to spend uniformly throughout the day, the third content serving component may have spent just $5 corresponding to half of the original $10 budget allocation. Without further configuration and management, the third budget pacing component would determine that in order to spend uniformly throughout the day, it should have spent $450 of the $900 modified third portion of the content item budget at this point (mid-day). The third budget pacing component would therefore attempt to reduce this lag and reach the target state ($450 spend) as soon as possible. This would result in a spend spike over a short period of time, which is undesirable. Further, if the traffic increase is performed late in the day (rather than mid-day), then there may not be an adequate opportunity to spend the increased third portion of the content item budget.

Accordingly, a new spend amount for the third budget pacing component is set based upon the modified traffic share of 90% and the overall spend so far of the content item budget by all of the budget pacing components. For example, $500 of the $1,000 content item budget may have been spent overall by all of the budget pacing components at mid-day (when traffic allocation was changed). Thus, the new spend amount by the third budget pacing component is set to $450 (e.g., 90% of the $500 of the content item budget that were already spent at mid-day). In this way, the third budget pacing component will not cause a spend spike at mid-day since at that point its new spend is exactly what it believes it should be (half of the $900 allocated to it).

In another example, if the traffic increase to 90% is performed after 95% of the day has gone by when the third budget pacing component has spent $9.50 of its allocated $10 budget (since it is configured to spend linearly throughout the day), then the third budget pacing component would think that an additional $890.50 must be spent by the end of the day after the traffic increase (since its newly allocated budget is 900$ and 9.5$ were already spent). To avoid a spend spike or a situation where the third budget pacing component has no opportunity to spend an additional $890.50 in a short period of time, a new spend amount of $855 is set for the third budget pacing component (90% of the $950 already spent by all budget pacing components at that point in time which would be the case, e.g., if they all spent linearly throughout the day). Thus, the third budget pacing component would think that it has spent exactly the amount that it believes it should have spent ($855) and it would need to spend just an additional $45 by the end of the day which is more likely to be possible.

In another example, a single budget pacing component may be assigned to control bidding by multiple content serving components, as illustrated by FIG. 5B. In an example, multiple budget pacing components may be assigned to control bidding by a single content serving component or a set of content serving components, as illustrated by FIG. 5C. In an example of assigning budget pacing components to content serving components, a budget pacing component experiment may be compared to a budget pacing component baseline. For the test, the budget pacing component experiment and the budget pacing component baseline are to be equal in all aspects except for the aspect being tested such as a budget pacing algorithm under test. Thus, the budget pacing component experiment and the budget pacing component baseline are assigned to control the same content serving components (e.g., all content serving components). In another example of assigning budget pacing components to content serving components, a content serving component experiment may be compared to a content serving component baseline that should be equal in all aspects except the aspect being tested, such as a content serving algorithm under test. Thus, both the content serving component experiment and the content serving component baseline are assigned to be controlled by the same budget pacing components (e.g., all budget pacing components). Or, two equivalent budget pacing components may be each assigned to one of the content serving components.

Figure 6:
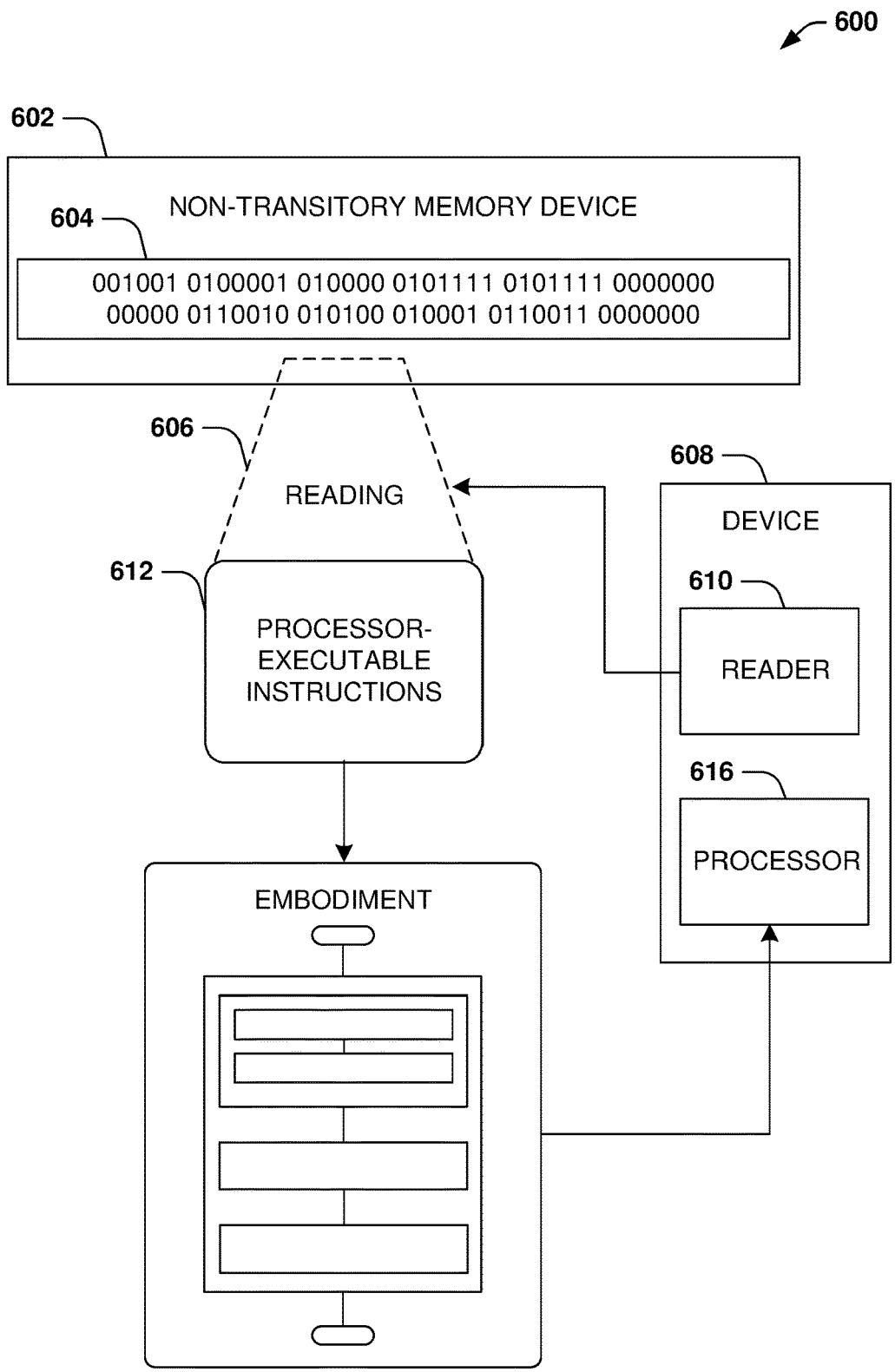
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIGS. 5A-5C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for online advertising campaign management for delivering online advertisements, comprising:
executing, on a processor of a computing device, instructions that cause the computing device to perform operations, the operations comprising:
assigning a first budget pacing component, of a budget pacing system, to control bidding by a first content serving component, of a content serving platform, for a set of content items to display, wherein the budget pacing system communicates with the content serving platform;
assigning a second budget pacing component, of the budget pacing system, to control bidding by a second content serving component, of the content serving platform, for the set of content items to display;
controlling the first budget pacing component to control the bidding by the first content serving component according to a first portion of a content item budget;
controlling the second budget pacing component to control the bidding by the second content serving component according to a second portion of the content item budget;
after controlling the bidding by the first content serving component and the second content serving component for a period of time:
determining a first spend amount of over the period of time by the first budget pacing component;
determining an overall spend over the period of time by a plurality of budget pacing components comprising the first budget pacing component and the second budget pacing component; and
dynamically modifying traffic shares allocated to the first content serving component and the second content serving component, wherein the dynamically modifying comprises modifying a first traffic share allocated to the first content serving component to a first modified traffic share and modifying a second traffic share allocated to the second content serving component to a second modified traffic share;
based upon the dynamically modifying traffic shares, determining a new spend amount for the first budget pacing component that avoids a spend spike by setting the new spend amount based upon (i) the first modified traffic share allocated to the first content serving component and (ii) the overall spend over the period of time by the plurality of budget pacing components comprising the first budget pacing component and the second budget pacing component;
responsive to determining the new spend amount, setting a spend amount of the first budget pacing component to be the new spend amount; and
determining performance of the first content serving component and the second content serving component in serving the set of content items.

2. The method of claim 1, comprising:
controlling the content serving platform based upon the performance of the first content serving component and the second content serving component in serving the set of content items.

3. The method of claim 1, comprising:
determining the second portion of the content item budget based upon a traffic share of content display opportunities routed to the second content serving component.

4. The method of claim 1, comprising:
assigning the first traffic share of content display opportunities to the first content serving component and the second traffic share of content display opportunities to the second content serving component.

5. The method of claim 4, comprising:
setting the first portion of the content item budget as a first percentage of the content item budget, wherein the first percentage is derived from a first traffic share percentage of the first traffic share.

6. The method of claim 5, comprising:
setting the second portion of the content item budget as a second percentage of the content item budget, wherein the second percentage is derived from a second traffic share percentage of the second traffic share.

7. The method of claim 1, wherein one or more of the set of content items are budget constrained content items with a set budget for a time period.

8. The method of claim 7, wherein the set budget is to be depleted within the time period.

9. The method of claim 1, wherein the setting the spend amount of the first budget pacing component to be the new spend amount corresponds to indicating that the first budget pacing component spent the new spend amount over the period of time rather than the first spend amount.

10. The method of claim 1, comprising:
assigning budget pacing components to control bidding by a plurality of content serving components, wherein each budget pacing component is assigned a budget as a function of a traffic share.

11. The method of claim 10, wherein multiple budget pacing components are assigned to control bidding by a single content serving component.

12. The method of claim 10, wherein a single budget pacing component is assigned to control bidding by multiple content serving components.

13. The method of claim 10, comprising:
tracking amounts spent by individual budget pacing components per content item; and
providing the amounts to the budget pacing components.

14. A computing device comprising:
a processor; and
memory comprising processor-executable instructions that when executed by the processor cause performance of operations, the operations comprising:
assigning a first budget pacing component to control bidding by a first content serving component for a set of content items to display;
assigning a second budget pacing component to control bidding by a second content serving component for the set of content items to display;
controlling the first budget pacing component to control the bidding by the first content serving component according to a first portion of a content item budget derived from a first traffic share of the first content serving component;
controlling the second budget pacing component to control the bidding by the second content serving component according to a second portion of the content item budget, wherein the second portion of the content item budget is derived from a second traffic share of the second content serving component;
after controlling the bidding by the first content serving component and the second content serving component for a period of time:
determining a first spend amount of over the period of time by the first budget pacing component;

determining an overall spend over the period of time by a plurality of budget pacing components comprising the first budget pacing component and the second budget pacing component; and dynamically modifying traffic shares allocated to the first content serving component and the second content serving component, wherein the dynamically modifying comprises modifying the first traffic share allocated to the first content serving component to a first modified traffic share and modifying the second traffic share allocated to the second content serving component to a second modified traffic share;

based upon the dynamically modifying traffic shares, determining a new spend amount for the first budget pacing component that avoids a spend spike by setting the new spend amount based upon (i) the first modified traffic share allocated to the first content serving component and (ii) the overall spend over the period of time by the plurality of budget pacing components comprising the first budget pacing component and the second budget pacing component;

responsive to determining the new spend amount, setting a spend amount of the first budget pacing component to be the new spend amount; and determining performance of the first content serving component and the second content serving component in serving the set of content items.

15. The computing device of claim 14, wherein the operations comprise:

controlling the first content serving component to assign ranks to content items based upon bid values assigned by the first budget pacing component and probabilities of user interactions assigned to content items by the first content serving component.

16. The computing device of claim 14, wherein the operations comprise:

transmitting a content item to a provider for display to a user based upon a rank of the content item.

17. A non-transitory machine readable medium having stored thereon processor-executable instructions that when executed cause performance of operations, the operations comprising:

assigning a first budget pacing component to control bidding by a first content serving component for a set of budget constrained content items to display;

assigning a second budget pacing component to control bidding by a second content serving component for the set of budget constrained content items to display;

controlling the first budget pacing component to control the bidding by the first content serving component according to a first portion of a content item budget derived from a first traffic share of the first content serving component;

controlling the second budget pacing component to control the bidding by the second content serving component according to a second portion of the content item budget, wherein the second portion of the content item budget is derived from a second traffic share of the second content serving component;

after controlling the bidding by the first content serving component and the second content serving component for a period of time:

determining a first spend amount of over the period of time by the first budget pacing component;

determining an overall spend over the period of time by a plurality of budget pacing components comprising the first budget pacing component and the second budget pacing component; and dynamically modifying traffic shares allocated to the first content serving component and the second content serving component, wherein the dynamically modifying comprises modifying the first traffic share allocated to the first content serving component to a first modified traffic share and modifying the second traffic share allocated to the second content serving component to a second modified traffic share;

based upon the dynamically modifying traffic shares, determining a new spend amount for the first budget pacing component that avoids a spend spike by setting the new spend amount based upon (i) the first modified traffic share allocated to the first content serving component and (ii) the overall spend over the period of time by the plurality of budget pacing components comprising the first budget pacing component and the second budget pacing component;

responsive to determining the new spend amount, setting a spend amount of the first budget pacing component to be the new spend amount; and determining performance of the first content serving component and the second content serving component in serving the set of budget constrained content items.

18. The non-transitory machine readable medium of claim 17, wherein the operations comprise:

ranking the first content serving component based upon a revenue generated by the first content serving component from content items being interacted with by users.

19. The non-transitory machine readable medium of claim 17, wherein the first content serving component utilizes a first model to assign probabilities of user interaction with the set of budget constrained content items and the second content serving component utilizes a second model to assign probabilities of user interaction with the set of budget constrained content items.

20. The non-transitory machine readable medium of claim 17, wherein there is a one to one relationship between budget pacing components being assigned to content serving components.

* * * * *